United States Patent
Kitagawa et al.

(10) Patent No.: US 10,640,669 B2
(45) Date of Patent: May 5, 2020

(54) CARBON BLACK COMPOSITION FOR MANUFACTURING PARTICULATE MAGNETIC RECORDING MEDIUM AND METHOD OF MANUFACTURING PARTICULATE MAGNETIC RECORDING MEDIUM

(71) Applicant: FUJIFILM Corporation, Tokyo (JP)

(72) Inventors: Soichiro Kitagawa, Minami-ashigara (JP); Toshihide Aoshima, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 578 days.

(21) Appl. No.: 15/280,095

(22) Filed: Sep. 29, 2016

(65) Prior Publication Data

US 2017/0088741 A1  Mar. 30, 2017

(30) Foreign Application Priority Data

Sep. 30, 2015  (JP) .................... 2015-195158
Sep. 27, 2016  (JP) .................... 2016-188745

(51) Int. Cl.
    *C09D 127/22*    (2006.01)
    *G11B 5/73*      (2006.01)

(52) U.S. Cl.
    CPC .......... *C09D 127/22* (2013.01); *G11B 5/7305* (2013.01)

(58) Field of Classification Search
    None
    See application file for complete search history.

(56) References Cited

U.S. PATENT DOCUMENTS 4,253,886 A * 3/1981 Aonuma .................. B22F 1/02
                                                    148/105
4,707,411 A    11/1987 Nakayama et al.
5,536,567 A *  7/1996 Kato ..................... G11B 5/7022
                                                    428/323
2013/0065169 A1* 3/2013 Iwasaki .................. G03G 15/75
                                                    430/56
2015/0064500 A1  3/2015 Aoshima et al.

FOREIGN PATENT DOCUMENTS

| JP | 60-238306 A  | 11/1985 |
| JP | 61-53367 A   | 3/1986  |
| JP | 7-296365 A   | 11/1995 |
| JP | 2003-331414 A| 11/2003 |
| JP | 2004-285140 A| 10/2004 |
| JP | 2015-64922 A | 4/2015  |

OTHER PUBLICATIONS

Machine Translation of JP 07-296365 A (Year: 1995).*
Machine Translation of JP 2003-331414 A (Year: 2003).*
Office Action dated Mar. 20, 2018 from the Japanese Patent Office in counterpart Japanese Application No. 2016-188745.

* cited by examiner

*Primary Examiner* — Kevin M Bernatz
(74) *Attorney, Agent, or Firm* — Sughrue Mion, PLLC

(57) ABSTRACT

The carbon black composition for manufacturing a particulate magnetic recording medium contains carbon black, vinyl chloride resin containing one or more epoxy groups, the secondary monoamine denoted by formula 1, and solvent,

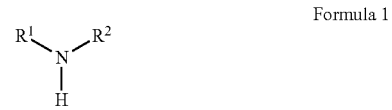

Formula 1 wherein, in formula 1, each of $R^1$ and $R^2$ independently denotes an alkyl group branching off at a carbon atom, the carbon atom being present at an α-position relative to an amine nitrogen atom, and having a main structure with 7 or fewer carbon atoms, it being possible for the alkyl group denoted by $R^1$ to be in the form of a cyclic structure, possible for the alkyl group denoted by $R^2$ to be in the form of a cyclic structure, and possible for the alkyl group denoted by $R^1$ and the alkyl group denoted by $R^2$ be connected to form a cyclic structure, with neither $R^1$ nor $R^2$ containing a hydroxyl group.

18 Claims, No Drawings

CARBON BLACK COMPOSITION FOR MANUFACTURING PARTICULATE MAGNETIC RECORDING MEDIUM AND METHOD OF MANUFACTURING PARTICULATE MAGNETIC RECORDING MEDIUM

CROSS-REFERENCE TO RELATED APPLICATIONS

This application claims priority under 35 U.S.C. 119 to Japanese Patent Application No. 2015-195158 filed on Sep. 30, 2015 and Japanese Patent Application No. 2016-188745 filed on Sep. 27, 2016. Each of the above applications is hereby expressly incorporated by reference, in its entirety.

BACKGROUND OF THE INVENTION

Field of the Invention

The present invention relates to a carbon black composition for manufacturing a particulate magnetic recording medium and to a method of manufacturing a particulate magnetic recording medium.

Discussion of the Background

Magnetic recording media come in the form of particulate magnetic recording media having a magnetic layer, fabricated by coating a magnetic layer-forming composition containing ferromagnetic powder and binder dispersed in solvent on a nonmagnetic support, and magnetic recording media with a thin metal film, formed by depositing ferromagnetic powder to form a film on a nonmagnetic support. Particulate magnetic recording media are known to be superior from the perspectives of production properties and general utility. Unless specifically stated otherwise, the term magnetic recording media will be used with the meaning of particulate magnetic recording media hereinafter.

In particulate magnetic recording media, binder plays important roles in various kinds of performance. A variety of resins have been proposed for use as the binder. Of these, vinyl chloride resin containing epoxy groups is known as the binder that can contribute to achieving higher performance in magnetic recording media by enhancing heat stability by means of their epoxy groups (for example, see, page 4, upper left column, lines 15 to 16 of Japanese Unexamined Patent Application (KOKAI) Showa No. 61-53367, and page 4, upper right column, lines 6 to 9 of Japanese Unexamined Patent Application (KOKAI) Showa No. 60-238306) and have been widely employed in recent years. The contents of the above publications and their English language family member U.S. Pat. No. 4,707,411 are expressly incorporated herein by reference in their entirety.

The positioning of a nonmagnetic layer containing nonmagnetic powder and binder between the nonmagnetic support and the magnetic layer is also widely practiced to enhance the performance of a magnetic recording medium. Positioning a nonmagnetic layer can mask the roughness of the surface of the nonmagnetic support, thereby making it an effective way to enhance the surface smoothness of the magnetic layer formed over the nonmagnetic layer, that is, enhance the smoothness of the surface of the magnetic recording medium (the surface on the magnetic layer side). Enhancing the smoothness of the surface of a magnetic recording medium makes it possible to reduce the drop in output due to spacing (spacing loss) between the magnetic recording medium and magnetic head during reproduction by a magnetic head of a signal recorded on a magnetic recording medium. The use of carbon black as the nonmagnetic powder in the nonmagnetic layer can also be anticipated to have an antistatic effect.

A nonmagnetic layer containing carbon black is usually formed by coating and drying a composition containing carbon black, binder, and solvent on a nonmagnetic support. The higher the degree to which the carbon black is dispersed in the composition, the smoother the surface of the nonmagnetic layer that is formed using the composition, and as a result, the greater the surface smoothness of the magnetic layer that is formed on the nonmagnetic layer, that is, the smoother the surface of the magnetic recording medium (the surface on the magnetic layer side). Providing a nonmagnetic layer containing carbon black is desirable because it can be expected to provide the antistatic effect mentioned above. However, carbon black is a component that tends to aggregate in common solvents. For this reason, research has been conducted into components that are capable of functioning as dispersing agents for carbon black. To this end, for example, Japanese Unexamined Patent Application (KOKAI) No. 2004-285140, which is expressly incorporated herein by reference in its entirety, proposes the use of an amine compound as a dispersing agent for carbon black.

SUMMARY OF THE INVENTION

Heightening the degree of dispersion of carbon black in the composition containing carbon black, binder and solvent as set forth above is desirable to increase the surface smoothness of the nonmagnetic layer that is formed using the composition. In particulate magnetic recording media, carbon black is also widely employed as nonmagnetic powder in the backcoat layer that is sometimes provided on the opposite side of the nonmagnetic support from the side on which the magnetic layer and nonmagnetic layer are formed. If the degree of dispersion of the carbon black in the composition that is used to form the backcoat layer can be increased, it becomes possible to form a backcoat layer with a highly smooth surface. For example, in a magnetic recording medium in the form of a tape (magnetic tape), enhancing the surface smoothness of the backcoat layer can inhibit the formation of indentations (known as "rear transfer") (or can inhibit the formation of deep indentations) when the surface of the magnetic layer comes into contact with the surface of the backcoat layer when in a wound state.

In addition to a high degree of dispersion of powder components such as carbon black, a high degree of liquid stability is also required for a composition for manufacturing a particulate magnetic recording medium. Even assuming that a high degree of dispersion can be achieved during manufacturing of the composition, if the viscosity of the composition ends up increasing significantly or the composition solidifies during the period following manufacturing through actual use of the composition (liquid) to form a layer, the surface smoothness of the layer that has been formed with the composition will end up decreasing. For this reason, it is required to enhance the stability of the composition in addition to increasing the dispersion of the carbon black in a composition containing carbon black, binder, and solvent.

As stated above, vinyl chloride resin containing epoxy groups is useful binder for enhancing the performance of magnetic recording media. Accordingly, when the present inventors examined the use of vinyl chloride resin containing epoxy groups as the binder in compositions containing carbon black and binder, they determined that it was not easy to enhance the stability of the composition or the dispersion of the carbon black.

An aspect of the present invention provides for means of enhancing the dispersion of carbon black and the stability of the composition in a composition for manufacturing a particulate magnetic recording medium (carbon black composition) containing carbon black, vinyl chloride resin containing epoxy groups, and solvent.

An aspect of the present invention relates to:

a carbon black composition for manufacturing a particulate magnetic recording medium (also referred to as a "carbon black composition" or "composition" hereinafter), containing:

carbon black, vinyl chloride resin containing one or more epoxy groups, the secondary monoamine denoted by formula 1 below, and solvent.

That is, the above carbon black composition contains vinyl chloride resin containing epoxy groups as binder, and is capable of enhancing the dispersion of carbon black and the stability of the composition.

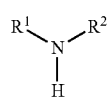

Formula 1

(In formula 1, each of $R^1$ and $R^2$ independently denotes an alkyl group branching off at a carbon atom, the carbon atom being present at an α-position relative to an amine nitrogen atom, and having a main structure with 7 or fewer carbon atoms, it being possible for the alkyl group denoted by $R^1$ to be in the form of a cyclic structure, possible for the alkyl group denoted by $R^2$ to be in the form of a cyclic structure, and possible for the alkyl group denoted by $R^1$ and the alkyl group denoted by $R^2$ be connected to form a cyclic structure, with neither $R^1$ nor $R^2$ containing a hydroxyl group.)

The amine nitrogen atom is the nitrogen atom N present between $R^1$ and $R^2$. The carbon atom being present at an α-position relative to the amine nitrogen atom is a carbon atom (α-carbon) adjacent to the amine nitrogen atom. The number of carbon atoms in the main structure of $R^1$ and $R^2$ refers to the number of carbon atoms in the alkyl group with the highest number of carbon atoms among the two or more alkyl groups present in the branched alkyl group (the number of carbon atoms of the portion excluding the substituent when the alkyl group contains a substituent).

In the present invention and present specification, the term "resin" refers to polymer having one or more repeating units which are identical to or different from each other, in the form of homopolymer or copolymer. The vinyl chloride resin containing one or more epoxy groups is vinyl chloride resin containing one or more epoxy groups in the structure. The term "binder" refers to one or more types of resin.

The present inventors presume the following to be why it is possible to enhance the dispersion of a carbon black composition containing vinyl chloride resin containing one or more epoxy groups and the dispersion stability thereof by means of the secondary monoamine denoted by formula 1.

(1) In enhancing the dispersion of carbon black with an amine compound, the present inventors presume that the adsorption of an amine compound in the form of a basic compound to an acidic group (such as a carboxyl group) present on the surface of carbon black can contribute to changing the polarity of the surface of the carbon black. The present inventors presume that adsorption of the amine compound to the surface of carbon black can be affected and determined by the basicity of the compound and by steric hindrance around the amine nitrogen atom. Of the various amine compounds, the present inventors presume that the secondary monoamine compound denoted by formula 1 can afford a good balance between basicity and steric hindrance around the nitrogen atom of the amine, resulting in improved dispersion of carbon black. Japanese Unexamined Patent Application (KOKAI) No. 2004-285140 set forth above, paragraph 0015, states that compounds having secondary amino groups (secondary amines) decrease the dispersion of carbon black. Thus, the fact that it is possible to enhance the dispersion of carbon black by means of the secondary monoamine denoted by formula 1 is unexpected.

(2) With regard to composition stability, the present inventors presume that the presence of a compound that will readily react with epoxy groups in a composition containing vinyl chloride resin containing one or more epoxy groups can cause the compound in the composition to react with the epoxy groups of the vinyl chloride resin containing one or more epoxy groups, resulting in a significant rise in the viscosity of the composition and solidification of the composition. In this regard, the fact that the each of $R^1$ and $R^2$ in the secondary monoamine denoted by formula 1 has a branching structure at an α-position carbon atom, the fact that the number of carbon atoms in the main structure is 7 or fewer, and the fact that no hydroxyl groups are present can contribute to making it difficult to react with the epoxy groups. The present inventors presume that this is what can improve the stability of the composition.

The above presumptions by the present inventors regarding the carbon black composition are nothing more than presumptions and are not intended to limit the present invention in any way.

In one embodiment, the vinyl chloride resin containing one or more epoxy groups contains one or more groups selected from the group consisting of a sulfonic acid group and a salt thereof. The salt of sulfonic acid ($-SO_3H$) is a salt denoted as $-SO_3^-M^+$. In this representation, $M^+$ denotes a cation such as an alkali metal ion. Hereinafter, the term "sulfonic acid (salt) group" is used with a meaning that includes a sulfonic acid group and a salt of sulfonic acid.

In one embodiment, the molecular weight of the above secondary monoamine falls within a range of 85 to 300.

In one embodiment, the above secondary monoamine contains at least one selected from the group consisting of an alkyl group having a branched methyl group, a piperidine ring, and a cyclohexane ring.

In one embodiment, the secondary monoamine is at least one selected from the group consisting of tetramethylpiperidine, isopropylhexylamine, dicyclohexylamine, di-sec-butylamine, and diisopropylamine.

In one embodiment, the boiling point of the above secondary monoamine is greater than or equal to 100° C. The boiling point is a value that is measured with the boiling point measuring device specified by JIS K2233-1989 7.1.1.

In one embodiment, the solvent contains ketone solvent.

In one embodiment, the carbon black composition contains 2.0 to 10.0 weight parts of the above secondary monoamine per 100.0 weight parts of the carbon black.

In one embodiment, the carbon black composition contains 20.0 to 50.0 weight parts of the vinyl chloride resin containing one or more epoxy groups per 100.0 weight parts of the carbon black.

In one embodiment, the carbon black composition is a nonmagnetic layer-forming composition of a particulate magnetic recording medium.

A further aspect of the present invention relates to:

a method of manufacturing a particulate magnetic recording medium containing, on a nonmagnetic support, a nonmagnetic layer containing nonmagnetic powder and binder and a magnetic layer containing ferromagnetic powder and binder on the nonmagnetic layer, including:

forming the nonmagnetic layer by coating and drying the above carbon black composition on a nonmagnetic support.

In one embodiment, the above manufacturing method includes forming the magnetic layer by coating and drying a magnetic layer-forming composition containing ferromagnetic hexagonal ferrite powder and binder on the nonmagnetic layer.

A further aspect of the present invention relates to a particulate magnetic recording medium that is manufactured by the above manufacturing method. This particulate magnetic recording medium includes a nonmagnetic layer that is formed with the above carbon black composition according to an aspect of the present invention, and thus can afford a new structure and/or new physical properties not present in conventional magnetic recording media.

An aspect of the present invention can provide a carbon black composition that affords good carbon black dispersion and composition stability and is suited to the manufacturing of particulate magnetic recording media. In addition, an aspect of the present invention can provide a method of manufacturing a particulate magnetic recording medium employing the above carbon black composition.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the multiple reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Carbon Black Composition for Manufacturing Particulate Magnetic Recording Medium An aspect of the present invention relates to:

a carbon black composition for manufacturing a particulate magnetic recording medium, containing:

carbon black, vinyl chloride resin containing one or more epoxy groups, the secondary monoamine denoted by formula 1 below, and solvent.

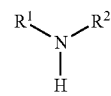

Formula 1

(In formula 1, each of $R^1$ and $R^2$ independently denotes an alkyl group branching off at a carbon atom, the carbon atom being present at an α-position relative to an amine nitrogen atom, and having a main structure with 7 or fewer carbon atoms, it being possible for the alkyl group denoted by $R^1$ to be in the form of a cyclic structure, possible for the alkyl group denoted by $R^2$ to be in the form of a cyclic structure, and possible for the alkyl group denoted by $R^1$ and the alkyl group denoted by $R^2$ be connected to form a cyclic structure, with neither $R^1$ nor $R^2$ containing a hydroxyl group.)

The above carbon black composition will be described in greater detail below.

<Secondary Monoamine Denoted by Formula 1>

The secondary monoamine contained in the carbon black composition is denoted by formula 1 set forth above.

In formula 1, each of $R^1$ and $R^2$ independently denotes an alkyl group branching off at a carbon atom, the carbon atom being present at an α-position relative to an amine nitrogen atom, and having a main structure with 7 or fewer carbon atoms. The present inventors presume that the presence of such a structure can contribute to enhancing the dispersion of carbon black and the stability of the composition. The number of carbon atoms of the main structure desirably falls within a range of 2 to 6.

That is, when the α-position carbon atoms (α-carbons) relative to the amine nitrogen atom are clearly indicated, formula 1 becomes formula 1-1 below.

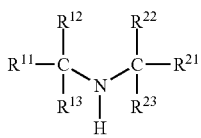

Formula 1-1

In formula 1-1, $R^{11}R^{12}R^{13}C$—correspond to $R^1$ in formula 1. $R^{21}R^{22}R^{23}C$—correspond to $R^2$ in formula 1. At least two from among $R^{11}$, $R^{12}$, and $R^{13}$ are alkyl groups, and at least two from among $R^{21}$, $R^{22}$, and $R^{23}$ are alkyl groups. A 1 representing the α-carbon is added to the number of carbon atoms (the number of carbon atoms of the portion excluding the substituent for an alkyl group containing a substituent) of the alkyl group with the greatest number of carbon atoms present among the two or more alkyl groups among $R^{11}$, $R^{12}$, and $R^{13}$ to obtain the number of carbon atoms of the main structure. Similarly, a 1 representing the α-carbon is added to the number of carbon atoms (the number of carbon atoms of the portion excluding the substituent for an alkyl group containing a substituent) of the alkyl group with the greatest number of carbon atoms present among the two or more alkyl groups among $R^{21}$, $R^{22}$, and $R^{23}$ to obtain the number of carbon atoms of the main structure.

On the α-position carbon atoms in formula 1, one or two alkyl groups can branch off the alkyl group constituting the main structure. That is, among $R^{11}$, $R^{12}$, and $R^{13}$ in formula 1-1, if $R^{11}$ is adopted as the alkyl group constituting the main structure, either $R^{12}$ or $R^{13}$ can be an alkyl group and the other can be a hydrogen atom or a substituent other than an alkyl group, or both can be alkyl groups. Similarly, among $R^{21}$, $R^{22}$, and $R^{23}$, if $R^{21}$ is adopted as the alkyl group constituting the main structure, either $R^{22}$ or $R^{23}$ can be an alkyl group and the other can be a hydrogen atom or a substituent other than an alkyl group, or both can be alkyl groups. These alkyl groups, which branch off the alkyl group constituting the main structure, have fewer carbon atoms than the alkyl groups constituting the main structure. For example, they are linear or branched alkyl groups with 1 to 3 carbon atoms, desirably linear alkyl groups with 1 or 2 carbon atoms, and preferably methyl groups. The substituents other than alkyl groups referred to above can be, for example, halogen atoms (such as chlorine atoms, bromine atoms, or iodine atoms). Unless specifically stated otherwise, the various groups referred to in the present invention and present specification can be substituted or unsubstituted. When substituted, the above are examples of the substituents. However, the substituents are not hydroxyl groups. This point will be described in greater detail below.

In $R^1$ in formula 1, a cyclic structure can be formed within the alkyl group denoted by $R^1$. That is, in formula 1-1, two or all three of $R^{11}$, $R^{12}$, and $R^{13}$ can be connected to form a cyclic structure. Similarly, in $R^2$ in formula 1, a cyclic structure can be formed within the alkyl group denoted by $R^2$. That is, in formula 1-1, two or all three of $R^{21}$, $R^{22}$, and $R^{23}$ can be connected to form a cyclic structure. The cyclic structure that is formed can be a single ring or a fused ring, with a single ring being desirable. The cyclic structure is desirably a cycloalkane ring having 1 to 7 carbon atoms, preferably a cyclohexane ring.

In formula 1, the alkyl group denoted by $R^1$ and the alkyl group denoted by $R^2$ can be connected to form a ring structure. That is, in formula 1-1, one or more from among $R^{11}$, $R^{12}$, and $R^{13}$ can connected to one or more from among $R^{21}$, $R^{22}$, and $R^{23}$ to form a cyclic structure. Thus, a nitrogen-containing cyclic structure containing the amine nitrogen atom as a constituent atom of a cyclic structure is formed. The nitrogen-containing cyclic structure that is formed can be a single ring or a fused ring, with a single ring being desirable. The nitrogen-containing cyclic structure is preferably a piperidine ring or a pyrrolidine ring, preferably a piperidine ring.

In the secondary monoamine denoted by formula 1, the alkyl groups denoted by $R^1$ and $R^2$ can contain substituents. However, the secondary monoamine denoted by formula 1 is a compound that does not contain hydroxyl groups due to the high reactivity with epoxy groups. The present inventors presume this to contribute to enhancing the stability of the composition.

The secondary monoamine denoted by formula 1 that has been set forth above can be highly basic and has poor reactivity with epoxy groups, and is presumed by the present inventors to contribute to enhancing the dispersion of carbon black and the stability of the composition. With regard to basicity, the pH as measured by the method described further below in Examples is desirably greater than or equal to 10.2. As regards reactivity with epoxy groups, it is desirable for the epoxy reactivity as evaluated by the method set forth further below in Examples to be "None".

From the perspective of the ease of handling the compound, the boiling point of the secondary monoamine denoted by Formula 1 is desirably greater than or equal to 110° C. However, since it suffices to adjust the atmospheric temperature and/or the liquid temperature of the composition when it is lower than 110° C., the boiling point of the secondary monoamine denoted by formula 1 can be lower than 110° C. From this perspective, the boiling point of the secondary monoamine denoted by formula 1 can be, for example, greater than or equal to 80° C. The boiling point of the secondary monoamine denoted by formula 1 can be, for example, less than or equal to 300° C., but is not limited to such a range.

From the perspective of further enhancing the stability of the composition, the molecular weight of the secondary monoamine denoted by formula 1 is desirably less than or equal to 300, preferably less than or equal to 200. The molecular weight is, for example, greater than or equal to 85, but can be lower than this.

In the present invention and present specification, the "molecular weight" of polymer refers to a polystyrene-converted value measured under the following conditions by gel permeation chromatography (GPC). The secondary monoamine denoted by formula 1 is desirably not polymer, but rather monomer.

| GPC device: | HLC-8120 (made by Tosoh) |
|---|---|
| Column: | TSK gel Multipore HXL-M (7.8 mm ID (inner diameter) x 30.0 cm, made by Tosoh) |
| Eluent: | Tetrahydrofuran (THF) |

The secondary monoamine denoted by formula 1 set forth above is available in the form of commercial products and can be synthesized by known methods. Specific examples of the secondary monoamine denoted by formula 1 are: tetramethylpiperidine, isopropylhexylamine, dicyclohexylamine, di-sec-butylamine, diisopropylamine, di-tert-butylamine, and 2,5-dimethylpyrrolidine. However, the present invention is not limited to these specific examples.

The content of the secondary monoamine denoted by formula 1 in the carbon black composition desirably falls within a range of 2.0 to 10.0 weight parts, preferably within a range of 4.0 to 6.0 weight parts, per 100.0 weight parts of carbon black. One type of secondary monoamine denoted by formula 1 can be contained in the carbon black composition, or two or more types can be incorporated. When two or more types are incorporated, the above content refers to the combined content. A single type, or two or more types, of each of the components described in the present invention and the present specification can be employed. When employing two or more types, the content of the component is the combined content of the two or more types.

<Carbon Black>

The carbon black that is contained in the carbon black composition is not specifically limited. Various types of carbon black such as rubber-use furnace, rubber-use thermal, color-use black, electrically conductive carbon black, and acetylene black can be suitably selected for use. For example, reference can be made to the *Carbon Black Handbook* (compiled by the Carbon Black Association), which is expressly incorporated herein by reference in its entirety, for carbon black that is suitable for use.

By way of example, the carbon black that is employed in particulate magnetic recording media normally has a specific surface area of 50 m$^2$/g to 500 m$^2$/g, desirably 70 m$^2$/g to 400 m$^2$/g. The specific surface area is a value that is obtained by the nitrogen adsorption method (also referred to as the Brunauer-Emmett-Teller (BET) single-point method). It is a value obtained by measuring primary particles. The specific surface area that is obtained by such a method is also referred to as the BET specific surface area hereinafter. The dibutyl phthalate (DBP) oil absorption capacity is normally 20 mL/100 g to 400 mL/100 g, desirably 30 mL/100 g to 400 mL/100 g. The average primary particle size is normally 5 nm to 80 nm, desirably 10 nm to 50 nm, and preferably, 10 nm to 40 nm. By way of example, the pH falls within a range of 2.0 to 11.0

The DBP oil absorption capacity is a value that is measured according to JIS K 6217-4:2008. The pH of the carbon black is a value that is measured according to JIS 6221-1982.

In the present invention and present specification, the average particle size of powder such as carbon black is a value that is measured by the method set forth below employing a transmission electron microscope. The term powder means a collection of multiple particles. The term collection is not limited to states in which the constituent particles are in direct contact, but also includes forms in which binder, an additive, or the like is present between the particles. The term particles is also sometimes used to denote powder. The above is also applied to the various types of powder in the present invention and the present specification, such as ferromagnetic powder.

Powder is photographed at a magnification of 100,000-fold with a transmission electron microscope, and the photograph is printed on print paper at a total magnification of 500,000-fold to obtain a photograph of the particles constituting the powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and present specification, the average particle size of the various types of powder is the average particle size as obtained by the above method unless specifically stated otherwise. The average particle size indicated in Examples further below was obtained using a Model H-9000 transmission electron microscope made by Hitachi and KS-400 image analysis software made by Carl Zeiss.

In the present invention and present specification, the size of the particles constituting powder (particle size) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of the powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

<Vinyl Chloride Resin Containing One or More Epoxy Groups>

The above carbon black composition contains vinyl chloride resin containing one or more epoxy groups in addition to carbon black and the solvent that is described in detail further below. As stated above, the vinyl chloride resin containing one or more epoxy groups is resin that can be useful as binder in contributing to enhancing the performance of the magnetic recording medium. Those vinyl chloride resins containing one or more epoxy groups that are commonly employed as binder in particulate magnetic recording media can be employed without limitation as the vinyl chloride resin containing one or more epoxy groups. Reference can be made to the full descriptions given in Japanese Unexamined Patent Publication (KOKAI) Showa Nos. 61-53367 and 60-238306. The vinyl chloride resin containing one or more epoxy groups can be synthesized by known methods or obtained in the form of a commercial product. Examples of commercial products are the MR resins manufactured by Kaneka Corp. (such as MR 104 and MR110).

From the perspective of further enhancing the dispersion of carbon black, it is desirable for the vinyl chloride resin containing one or more epoxy groups to contain one or more groups selected from the group consisting of sulfonic acid (salt) groups, phosphoric acid groups (—P=O(OH)$_2$), and salts of phosphoric acid (—P=O(O$^-$M$^+$)$_2$, where M+ is defined as above), and preferable for it to contain one or more sulfonic acid (salt) groups.

The carbon black composition can contain, for example, 10.0 to 80.0 weight parts, desirably 15.0 to 60.0 weight parts, and more preferably 20.0 to 50.0 weight parts, of the vinyl chloride resin containing one or more epoxy groups per 100.0 weight parts of carbon black. The carbon black composition can contain just the vinyl chloride resin containing one or more epoxy groups, or can contain one or more other resins. When one or more other resins are incorporated, from the perspective of enhancing the performance of the magnetic recording medium that is formed using the carbon black composition, it is desirable for the vinyl chloride resin containing one or more epoxy groups to account for 50.0 weight parts or more per 100.0 weight parts of the total quantity of resin. It is also desirable for the entire quantity of resin to be vinyl chloride resin containing one or more epoxy groups. When one or more other resins are incorporated, various resins that are commonly employed as the binder in particulate magnetic recording media, such as polyurethane resins, polyester resins, polyamide resins, acrylic resins, cellulose resins, phenoxy resins, and polyvinyl alkyral resins can be employed without limitation. The combined content of the resins contained in the carbon black composition can be, for example, 20.0 to 100.0 weight parts, and is desirably 30.0 to 80.0 weight parts, per 100.0 weight parts of carbon black.

<Solvent>

The various types of organic solvent that are commonly employed in the manufacturing of particulate magnetic recording media can be employed singly or mixed in any ratio in a combination of two or more as the solvent contained in the carbon black composition. Of these, ketone solvent that is widely employed in the manufacturing of particulate magnetic recording media is desirably employed as the solvent. Specific examples of ketone solvents are acetone, methyl ethyl ketone, methyl isopropyl ketone, and cyclohexanone. The content of the ketone solvent is desirably greater than or equal to 60.0 weight parts, preferably greater than or equal to 75.0 weight parts, per 100.0 weight parts of the total quantity of solvent. The content of ketone solvent is, for example, less than or equal to 90.0 weight parts per 100.0 weight parts of the total quantity of solvent, and the entire quantity can be in the form of ketone solvent. Examples of organic solvent other than ketone solvent are methanol, ethanol, isopropanol, toluene, xylene, ethylbenzene, ethyl formate, ethyl acetate, butyl acetate, dioxane, tetrahydrofuran, dimethylformamide, and isophorone. One or more of these can be employed as solvent together with ketone solvent, or in place of ketone solvent, to prepare the carbon black composition.

<Optional Components>

The above carbon black composition contains the various components set forth above, and can contain one or more other optional components. The optionally added components (optional components) are not specifically limited. Examples are the various components employed in the manufacturing of particulate magnetic recording media. One or more types of nonmagnetic powder can be incorporated in any quantity in addition to carbon black. In that case, carbon black desirably accounts for the greatest part of the total quantity of nonmagnetic powder. Carbon black desirably accounts for 50.0 weight parts or more, preferably accounts for 70.0 weight parts or more, and more preferably accounts for 80.0 weight parts or more, per 100.0 weight parts of the total quantity of nonmagnetic powder. The nonmagnetic powder that is employed in combination can be an organic or inorganic substance. Examples of inorganic substances are metals, metal oxides, metal carbonates, metal sulfates, metal nitrides, metal carbides, and metal sulfides. These nonmagnetic powders are available as commercial products and can be manufactured by known methods. Reference can be made to paragraphs 0146 to 0150 of Japanese Unexamined Patent Publication (KOKAI) No. 2011-216149, which is expressly incorporated herein by reference in its entirety, for details.

A curing agent such as polyisocyanate is an example of an optional component. For example, forming the nonmagnetic layer or backcoat layer of the magnetic recording medium with a carbon black composition that contains a curing agent is desirable from the perspective of enhancing the durability of the magnetic recording medium. It is desirable to employ a bifunctional or more polyisocyanate compound, and preferable to employ a trifunctional or more polyisocyanate. Polyisocyanate that is known to be used as a curing agent in magnetic recording media can be employed in a quantity of, for example, 5.0 to 100.0 weight parts per 100.0 weight parts of the total quantity of resin.

<Method of Preparing the Composition>

The above carbon black composition can be prepared by simultaneously or sequentially dispersing the components set forth above. Various known dispersers utilizing shearing force, such as bead mills, ball mills, sand mills, and homomixers, can be employed for dispersion. For example, dispersion can be conducted by bead dispersion employing dispersion beads. Glass beads, zirconia beads, titania beads, steel beads, and alumina beads are suitable as dispersion beads. These dispersion beads are desirably used by optimizing the bead diameter and fill rate. A known disperser can be employed. The solid component concentration of the carbon black composition falls, for example, within a range of 5.0 to 15.0 weight %. The term "solid component concentration" refers to the combined concentration of all of the components excluding the solvent in the carbon black composition.

The carbon black composition according to an aspect of the present invention that has been set forth above can be used to manufacture a particulate magnetic recording medium, and more particularly, can be used as a composition (coating liquid) to form the layer contained in a particulate magnetic recording medium. The above carbon black composition can be used to form a layer with good surface smoothness. It is desirably used as a nonmagnetic layer-forming composition or backcoat layer-forming composition, and is preferably employed as a nonmagnetic layer-forming composition.

Method of Manufacturing Particulate Magnetic Recording Medium

A further aspect of the present invention relates to a method of manufacturing a particulate magnetic recording medium containing on a nonmagnetic support a nonmagnetic layer containing nonmagnetic powder and binder, and a magnetic layer containing ferromagnetic powder and binder on the nonmagnetic layer, including forming a nonmagnetic layer by coating and drying the above carbon black composition on a nonmagnetic support.

The above manufacturing method will be described in greater detail below.

<Formation of Nonmagnetic Layer>

The carbon black composition that is used to form the nonmagnetic layer is as set forth above. The carbon black composition is sequentially or simultaneously multilayer coated with the magnetic layer-forming composition to manufacture a magnetic recording medium sequentially containing on a nonmagnetic support a nonmagnetic layer and a magnetic layer. The nonmagnetic layer of the magnetic recording medium that is thus formed contains binder in the form of vinyl chloride resin containing one or more epoxy groups and nonmagnetic powder in the form of carbon black. The nonmagnetic layer can contain epoxy groups in the form of the epoxy groups contained in the vinyl chloride resin containing one or more epoxy groups, one portion of which can be contained in a form achieved by reaction with other components contained in the nonmagnetic layer.

In one embodiment, binder of an electron beam-curable type requiring irradiation with an electron beam to form the nonmagnetic layer is desirably not contained in the binder of the nonmagnetic layer. In one embodiment, the process of forming the nonmagnetic layer desirably does not contain a step of irradiating an electron beam.

Essentially nonmagnetic layers that contain trace quantities of ferromagnetic powder, either as impurities or intentionally, for example, in addition to nonmagnetic powder fall within the scope of the nonmagnetic layer of the magnetic recording medium in the present invention. The term an "essentially nonmagnetic layer" means a layer with a residual magnetic flux density of less than or equal to 10 mT, or a coercive force of less than or equal to 7.96 kA/m (100 Oe), or both a residual magnetic flux density of less than or equal to 10 mT and a coercive force of less than or equal to 7.96 kA/m (100 Oe). The nonmagnetic layer desirably has no residual magnetic flux density or coercive force.

<Formation of Magnetic Layer>

The magnetic layer can be formed by sequentially or simultaneously multilayer coating a magnetic layer-forming composition containing ferromagnetic powder and binder and a nonmagnetic layer-forming composition (the above carbon black composition).

(Ferromagnetic Powder)

The various types of powder that are commonly employed as ferromagnetic powder in the magnetic layer of magnetic recording media can be employed as the ferromagnetic powder. The use of ferromagnetic powder of small average particle size is desirable from the perspective of increasing the recording density of the magnetic recording medium. For this reason, it is desirable to employ ferromagnetic powder with an average particle size of less than or equal to 50 nm as the ferromagnetic powder. From the perspective of stability of magnetization, the average particle size of the ferromagnetic powder is desirably greater than or equal to 10 nm.

Ferromagnetic hexagonal ferrite powder is a specific example of desirable ferromagnetic powder. From the perspectives of achieving higher density recording and magnetization stability, the average particle size (for example, average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size (for example, average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

From the perspective of enhancing the electromagnetic characteristics in a magnetic recording medium adapted to high-density recording, the magnetic layer desirably contains ferromagnetic powder in the form of ferromagnetic hexagonal ferrite powder, preferably in the form of ferromagnetic hexagonal barium ferrite powder.

The content of ferromagnetic powder (fill rate) in the magnetic layer desirably falls within a range of 50 to 90 weight %, preferably 60 to 90 weight %. A high fill rate is desirable from the perspective of enhancing the recording density.

(Binder)

Various types of binder that are commonly employed to manufacture particulate magnetic recording media can be employed without limitation as the binder that is contained in the magnetic layer-forming composition. The above vinyl chloride resin containing one or more epoxy groups is desirably employed. Reference can be made to Japanese Unexamined Patent Publication (KOKAI) No. 2010-24113, paragraphs 0028 to 0031, with regard to binder. The content of the above publication is expressly incorporated herein by reference in its entirety. A curing agent can be employed together with the above resin that is suitably employed as the binder. Polyisocyanate is suitable as a curing agent. Reference can be made to Japanese Unexamined Patent Publication (KOKAI) No. 2011-216149, paragraphs 0124 and 0125, for details regarding polyisocyanate. The curing agent is employed, for example, in a quantity of 0 to 80.0 weight parts, and From the perspective of enhancing the strength of the magnetic layer, desirably 50.0 to 80.0 weight parts, per 100.0 weight parts of binder.

(Other Additives and Solvent)

Additives can be added as needed to the magnetic layer-forming composition. Various types of nonmagnetic powder that are capable of functioning as abrasives or protrusion-forming agents, lubricants, dispersing agents, dispersing adjuvants, antifungal agents, antistatic agents, oxidation inhibitors, and carbon black are examples of additives. In an embodiment, the secondary monoamine denoted by formula 1 set forth above is desirably incorporated into the magnetic layer-forming composition containing carbon black. In that case, in one embodiment, binder in the form of the vinyl chloride resin containing one or more epoxy groups is desirably incorporated. The additives can be suitably selected for use from among commercial products based on the properties desired, or synthesized for use by known methods. The magnetic layer-forming composition normally contains solvent. The various organic solvents that are commonly employed in the manufacturing of magnetic recording media can be employed without limitation as the solvent.

<Nonmagnetic Support>

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Thickness of the Various Layers and the Nonmagnetic Support>

The thickness of the nonmagnetic support and the various layers in a magnetic recording medium that has been manufactured by the above manufacturing method are as follows.

The thickness of the nonmagnetic support is desirably 3.0 µm to 80.0 µm.

The thickness of the magnetic layer can be optimized based on the saturation magnetization and head gap length of the magnetic head employed, and the bandwidth of the recording signal. It can be generally from 10 nm to 150 nm, desirably from 20 nm to 120 nm, and preferably, from 30 nm to 100 nm. It suffices for the magnetic layer to be comprised of a single layer, but it can be separated into two or more layers with different magnetic characteristics. Known multilayer magnetic layer configurations can also be applied.

The thickness of the nonmagnetic layer is, for example, 0.1 µm to 3.0 µm, desirably 0.1 µm to 2.0 µm, and preferably 0.1 µm to 1.5 µm.

When a backcoat layer is present in the magnetic recording medium that is manufactured on the opposite side of the nonmagnetic support from the side on which the magnetic layer and nonmagnetic layer are present, the thickness of the backcoat layer is desirably less than or equal to 0.9 µm, preferably 0.1 µm to 0.7 µm. The backcoat layer can be formed by coating and drying a backcoat layer-forming composition containing carbon black and/or inorganic powder, binder, and normally solvent on the opposite side of the nonmagnetic support from the side on which the magnetic layer and nonmagnetic layer have been formed (or will be subsequently provided). Known techniques relating to the formulas of the magnetic layer and/or nonmagnetic layer can be applied to the binder that is contained in the backcoat layer and various optionally contained additives. In one embodiment, the above carbon black composition can be employed as the backcoat layer-forming composition.

<Manufacturing Process>

(Preparation of Compositions for Forming Various Layers>

The process of preparing compositions for forming the magnetic layer, nonmagnetic layer, and backcoat layer normally contains at least a dispersing step. For example, it contains a kneading step and dispersing step, as well as mixing steps provided as needed before and/or after these steps. Each step can be divided into two or more substeps. It does not matter whether the various components employed to prepare the composition for forming each layer are added at the outset or part way through a given step. In the process of manufacturing the above magnetic recording medium, conventionally known manufacturing techniques can be employed for some of the steps. It is desirable to employ an open kneader, continuous kneader, pressurized kneader, extruder or the like that exerts a powerful shearing force in the kneading step. Details regarding these kneading processes are described in Japanese Unexamined Patent Publication (KOKAI) Heisei Nos. 1-106338 and 1-79274, which are expressly incorporated herein by reference in their entirety. Various known dispersers utilizing shearing force, such as a bead mill, ball mill, sand mill, or homomixer, can be employed as the disperser. Dispersion beads are desirably employed in dispersion. The dispersion beads are as set forth above. The diameter and fill rate of the dispersion beads are not specifically limited and can be set based on the powder being dispersed.

(Coating Step)

The nonmagnetic layer and the magnetic layer can be formed by sequentially or simultaneously multilayer coating the nonmagnetic layer-forming composition and magnetic layer-forming composition. The backcoat layer can be formed by coating the backcoat layer-forming composition on the opposite side of the nonmagnetic support from the side on which the nonmagnetic layer and magnetic layer are present (or will be subsequently provided). Reference can be made to paragraph 0066 of Japanese Unexamined Patent Publication (KOKAI) No. 2010-231843, which is expressly incorporated herein by reference in its entirety, for details regarding coatings to form the various layers.

(Other Steps)

Reference can be made to Japanese Unexamined Patent Publication (KOKAI) No. 2010-231843, paragraphs 0067 to 0070, with regard to various other steps in the manufacturing of magnetic recording media.

The magnetic recording medium that is manufactured by the manufacturing method according to an aspect of the present invention set forth above can have a nonmagnetic layer with a high degree of surface smoothness and thus good surface smoothness.

EXAMPLES

The present invention will be described based on Examples below. However, the present invention is not intended to be limited by the embodiments described in Examples. The room temperature referred to below is within a range of 20° C. to 25° C.

[Examples of Preparation of Carbon Black Composition]

Example 1

The following components:

| Carbon black set forth below: | 1.0 weight parts |
| Amine compound given in Table 1: | 0.040 weight parts |
| Resin (1): | 1.0 weight part | were suspended in a mixed solvent of 12.0 weight parts of methyl ethyl ketone and 8.0 weight parts of cyclohexanone to obtain a suspension. To the suspension were added 120 g of zirconia beads (made by Nikkato) with a bead diameter of 0.1 mmφ and the mixture was dispersed for 15 hours to obtain a carbon black composition (dispersion).

The carbon black employed was #950B made by Mitsubishi Chemical Corp. (average particle size (average primary particle size): 18 nm; BET specific surface area: 260 $m^2$/g; DBP oil absorption capacity: 79 mL/100 g; pH: 7.5).

Resin (1) was vinyl chloride resin containing epoxy groups and sulfonate groups (MR104, solid component concentration of about 30 weight %, made by Kaneka Corp.).

Examples 2 to 4 and 6, Comparative Examples 1 to 4

With the exception that the amine compounds shown in Table 1 were employed as the amine compound, carbon black compositions were prepared by the same method as in Example 1.

Example 5

With the exceptions that the amine compound shown in Table 1 was employed as the amine compound and the following resin components were employed as the resin component:

Resin (1): 0.5 weight part
Resin (2): 0.5 weight part, a carbon black composition was prepared by the same method as in Example 1. Resin (2) was polyurethane resin containing sulfonate groups (UR4800, solid component concentration of about 30 weight %, made by Toyobo Co., Ltd.).

[Methods of Evaluating Carbon Black Compositions]

1. Evaluation of Dispersion

An approximately 5 mL quantity of the above carbon black composition (dispersion) was collected in a syringe, a filter cloth with an opening diameter of 0.1 mm was placed on the tip of the syringe, and filtering was conducted by discharging the dispersion from the syringe through the filter cloth. This filtration made it possible to remove the beads that had been employed in dispersion from the dispersion.

Following filtration, the carbon black composition was coated with a doctor blade having a gap of 2.5 μm on a polyethylene naphthalate (PEN) film (nonmagnetic support) made by Teijin and dried by standing for 60 minutes at room temperature to fabricate a coating film. The surface roughness of the coating film was measured under conditions of scan length: 5 μm, objective lens: 20×, intermediate lens: 1×, measurement viewfield: 260 μm×350 μm by the scanning white light interference method with a NewView 5022 general-purpose three-dimensional surface structure analyzer made by Zygo Corp. The measurement results were filtered with a high-pass filter (HPF): 1.65 μm and a low-pass filter (LPF): 50 μm to obtain the centerline average surface roughness value Ra.

The greater the degree of dispersion of the carbon black in the carbon black composition, the higher the degree of surface smoothness of the coating layer fabricated. Thus, the Ra value that was measured could be used as an indicator of the dispersion of carbon black in the carbon black composition. The dispersion was evaluated on the following scale based on the Ra value that was measured. A dispersion evaluation result of A or B was desirable, and A was preferable.

Ra value of less than or equal to 1.6 nm: A
Ra value of greater than 1.6 nm but less than or equal to 2.0: B
Ra value greater than 2.0 nm: C 2. Evaluation of Stability (Liquid Stability) of Composition The stability (liquid stability) of the composition was evaluated by the following method.

The above carbon black composition was left standing and stored for 3 days at room temperature following preparation. Following storage, the carbon black composition was filtered using the same syringe and filter cloth as in the filtration set forth in 1. above. When an increase in viscosity and/or solidification occurred during the above storage, a phenomenon whereby smooth filtration was precluded and/or a phenomenon whereby the surface of the dispersion was not smooth were observed. Accordingly, the liquid stability was evaluated on the following scale based on the behavior during the above filtration.

OK: Smooth filtration possible, with surface of filtered dispersion immediately becoming smooth NG: Smooth filtration impossible, or surface of dispersion failed to immediately become smooth The results of the above evaluation are given in Table 1.

TABLE 1

| | Amine compound | Resin | Ra: evaluation of dispersion evaluation | Result of liquid stability evaluation |
|---|---|---|---|---|
| Example 1 | 2,2,6,6-Tetramethylpiperidine | (1) | 1.4 nm: A | OK |
| Example 2 | Isopropylcyclohexylamine | (1) | 1.4 nm: A | OK |
| Example 3 | Dicyclohexylamine | (1) | 1.7 nm: B | OK |
| Example 4 | Di-sec-butylamine | (1) | 1.7 nm: B | OK |
| Example 5 | 2,2,6,6-Tetramethypiperidine | (1) + (2) | 1.7 nm: B | OK |
| Example 6 | Diisopropylamine | (1) | 1.8 nm: B | OK |
| Comparative Example 1 | 1,2,2,6,6-Pentamethylpiperidine | (1) | 2.2 nm: C | OK |
| Comparative Example 2 | Dioctylamine | (1) | 2.5 nm: C | NG |
| Comparative Example 3 | 2-(Isopropylamino)ethanol | (1) | 2.0 nm: B | NG |
| Comparative Example 4 | N-ethylisopropylamine | (1) | 2.0 nm: B | NG |

Based on the results given in Table 1, the carbon black compositions of Examples were determined to exhibit good carbon black dispersion and good stability of the composition.

[Examples of Manufacturing of Particulate Magnetic Recording Medium (Magnetic Tape)]

Examples 7 to 11 and Comparative Examples 5 to 8

(Formula of Magnetic Layer-Forming Composition)

Ferromagnetic plate-like hexagonal ferrite powder: 100.0 parts
Composition (molar ratio) excluding oxygen:
Ba/Fe/Co/Zn = 1/9/0.2/1
Coercive force: 160 kA/m (2,000 Oe)
Average particle size (average plate diameter): 20 nm
Average acicular ratio: 2.7
BET specific surface area: 60 $m^2$/g
Saturation magnetization σs: 46 A · $m^2$/kg (46 emu/g)
Polyurethane resin (Vylon (Japanese trademark) 4.0 parts
UR4800 made by Toyobo Co., Ltd.,
$SO_3Na$ concentration: 70 eq/ton, weight average
molecular weight: 70,000):
Vinyl chloride resin (MR104 made by 10.0 parts -continued

| | |
|---|---|
| Kaneka Corp., weight average molecular weight: 55,000): | |
| α-Al$_2$O$_3$ (average particle size: 0.1 μm): | 8.0 parts |
| Carbon black (average particle size: 0.08 μm): | 0.5 parts |
| Cyclohexanone: | 110.0 parts |

(Preparation of Magnetic Layer-Forming Composition)

The various above components were kneaded in an open kneader and then dispersed in a sand mill. The following components were added to the dispersion obtained. The mixture was stirred, ultrasonically processed, and filtered with a filter having an average pore diameter of 1 μm, yielding a magnetic layer-forming composition.

| | |
|---|---|
| Butyl stearate: | 1.5 parts |
| Stearic acid: | 0.5 part |
| Amide stearate: | 0.2 part |
| Methyl ethyl ketone: | 50.0 parts |
| Cyclohexanone: | 50.0 parts |
| Toluene: | 3.0 parts |
| Polyisocyanate compound (Coronate 3041 made by Nippon Polyurethane Industry Company, Ltd.): | 2.5 parts |

(Formula of Nonmagnetic Layer-Forming Composition (Carbon Black Composition)

| | |
|---|---|
| Nonmagnetic powder (α-Fe$_2$O$_3$ hematite): | 80.0 parts |
| Average particle size (average major axis length): 0.15 μm | |
| BET specific surface area: 52 m$^2$/g | |
| pH: 6 | |
| Tap density: 0.8 | |
| DBP oil absorption capacity: 27 to 38 g/100 g | |
| Surface treatment agents: Al$_2$O$_3$ and SiO$_2$ | |
| Carbon black: | 20.0 parts |
| Average particle size: 0.020 μm | |
| DBP oil absorption capacity: 80 mL/100 g | |
| pH: 8.0 | |
| BET specific surface area: 250 m$^2$/g | |
| Volatile components: 1.5% | |
| Amine compound given in Table 2: | 0.8 part |
| Resin (1): | 19.0 parts |
| Polyester polyol containing branching side chains/diphenyl-methane diisocyanate based one, SO$_3$Na concentration: 100 eq/ton | |
| Methyl ethyl ketone: | 150.0 parts |
| Cyclohexanone: | 150.0 parts |

(Preparation of Nonmagnetic Layer-Forming Composition)

The various above compounds were kneaded in an open kneader and then dispersed with a sand mill. The following components were added to the dispersion obtained and the mixture was stirred. The mixture was then filtered with a filter having an average pore diameter of 1 μm to obtain a nonmagnetic layer-forming composition.

| | |
|---|---|
| Butyl stearate: | 1.5 parts |
| Stearic acid: | 1.0 part |
| Methyl ethyl ketone: | 50.0 parts |
| Cyclohexanone: | 50.0 parts |
| Toluene: | 3.0 parts |
| Polyisocyanate compound (Coronate 3041 made by Nippon Polyurethane Industry Co., Ltd.): | 5.0 parts |

(Formula of Backcoat Layer-Forming Composition)

| | |
|---|---|
| Carbon black (average particle size: 40 nm): | 85.0 parts |
| Carbon black (average particle size: 100 nm): | 3.0 parts |
| Nitrocellulose: | 28.0 parts |
| Polyurethane resin: | 58.0 parts |
| Copper phthalocyanine dispersing agent: | 2.5 parts |
| Nipporan 2301 (made by Nippon Polyurethane Industry Co., Ltd.): | 0.5 part |
| Methyl isobutyl ketone: | 0.3 part |
| Methyl ethyl ketone: | 860.0 parts |
| Toluene: | 240.0 parts |

(Preparation of Backcoat Layer-Forming Composition)

The above components were prekneaded in a roll mill and then dispersed in a sand mill. To the mixture were added 4.0 parts of polyester resin (Vylon 500, made by Toyobo Co., Ltd.), 14.0 parts of polyisocyanate compound (Coronate 3041 made by Nippon Polyurethane Industry Co., Ltd.), and 5.0 parts of α-Al$_2$O$_3$ (made by Sumitomo Chemical Co., Ltd.). The mixture was stirred and filtered to obtain a backcoat layer-forming composition.

(Preparation of Magnetic Tape)

Both surfaces of a polyethylene naphthalate support 5.0 μm in thickness were corona discharge treated.

The above nonmagnetic layer-forming composition was coated in a quantity calculated to yield a dry thickness of 0.7 μm on one surface of the above polyethylene naphthalate support, and immediately thereafter, the magnetic layer-forming composition was simultaneously multilayer coated thereover in a quantity calculated to yield a magnetic layer thickness of 60 nm. While the two layers were still wet, they were subjected to a perpendicularly orientation treatment with a cobalt magnet with a magnetic force of 0.5 T (5,000 G) and a solenoid with a magnetic force of 0.4 T (4,000 G). They were then subjected to a drying treatment.

Subsequently, the backcoat layer-forming composition was coated in a quantity calculated to yield a dry thickness of 0.5 μm on the other surface of the polyethylene naphthalate support. Next, a calendering treatment was conducted with a seven-stage calender comprised of metal rolls at a calender roll surface temperature of 100° C. and a rate of 80 m/min, and the product was slit to a width of ½ inch (0.0127 m) to fabricate a magnetic tape.

[Method of Evaluating Magnetic Tapes]

<Average Surface Roughness of Tape>

The centerline average surface roughness Ra of the surface of the magnetic layer (measurement area: 40 μm×40 μm) of each of the magnetic tapes of Examples 7 to 11 and Comparative Examples 5 to 8 was measured in contact mode with an atomic force microscope (AFM: NanoScope V made by Bruker).

TABLE 2

| | Amine compound | Centerline average surface roughness Ra(nm) |
|---|---|---|
| Example 7 | 2,2,6,6-Tetramethylpiperidine | 1.5 |
| Example 8 | Isopropylcyclohexylamine | 1.5 |
| Example 9 | Dicyclohexylamine | 1.8 |
| Example 10 | Di-sec-butylamine | 1.8 |
| Example 11 | Diisopropylamine | 1.9 |
| Comparative Example 5 | 1,2,2,6,6-Pentamethylpiperidine | 2.3 |
| Comparative Example 6 | Dioctylamine | 2.6 |

TABLE 2-continued

| | Amine compound | Centerline average surface roughness Ra(nm) |
|---|---|---|
| Comparative Example 7 | 2-(Isopropylamino)ethanol | 2.1 |
| Comparative Example 8 | N-ethylisopropyl amine | 2.1 |

Based on the results given in Table 2, the magnetic layer of the magnetic tapes of Examples was determined to afford good surface smoothness. The reason for the surface smoothness of the magnetic layer of the magnetic tapes of Examples was thought to be good dispersion of carbon black in the composition (carbon black composition) employed to form the nonmagnetic layer positioned beneath the magnetic layer.

[Evaluation of Physical Properties of Amine Compounds]

The amine compounds employed in Examples were the secondary monoamines given in Table 1.

By contrast:

The amine compounds employed in Comparative Examples 1 and 5 were tertiary amines.

The amine compounds employed in Comparative Examples 2 and 6 were secondary monoamines, in which the alkyl group bounded to the amine nitrogen atom was a linear alkyl group with 8 or more carbon atoms that did not contain a branching structure at an α-carbon, that did not correspond to the secondary monoamine denoted by formula 1.

The amine compounds employed in Comparative Examples 3 and 7 were secondary monoamine containing hydroxyl groups.

The amine compounds employed in Comparative Examples 4 and 8 were secondary monoamines that did not correspond to the secondary monoamines denoted by formula 1.

Commercial products were employed for each of the amine compounds. The physical properties of the various amine compounds mentioned above were evaluated by the following methods.

1. Measurement of Boiling Point

The boiling point of each of the amine compounds was measured by the method set forth above.

2. Measurement of pH

The pH of a pH measurement solution, prepared by adding an amine compound to a mixed solvent obtained by mixing tetrahydrofuran (THF) and water in a volumetric ratio of former/latter=60/40 to an amine compound concentration of 5 mmol/L, was adopted as the pH of the amine compound.

The pH values given in Table 2 were the pH values measured in a titrator (AT-510, made by Kyoto Electronics Manufacturing Co., Ltd.) while stirring the pH measurement solution that had been prepared with a magnetic stirrer. The above titrator was employed here, but any device capable of pH measurement can be used. There is no limitation to this device.

3. Evaluation of Reactivity With Epoxy Groups

A sample was prepared by weighing out ethyleneglycol diglycidyl ether (EGDGE: made by Tokyo Chemical Industry Co., Ltd.) and an amine compound in a 1:1 molar ratio of the epoxy groups of the former to the nitrogen atoms of the latter and mixing them by shaking. A roughly 5 mg quantity of this sample was charged to an aluminum pan. Two cycles of differential scanning calorimetry were conducted at a rate of rise in temperature of 10° C./min over a temperature range of 0° C. to 200° C. The reactivity was determined based on whether an exothermic peak was present as the temperature was raised during the first cycle of the two cycles of raising the temperature as compared to EGDGE alone. When no exothermic peak was found, the reactivity was evaluated as "None", and when found, the reactivity was evaluated as "Present." The differential scanning calorimetry measurement was conducted with a differential scanning calorimeter (DSC made by Mettler Corp.).

The results of the above are given in Table 3. Highly basic compounds are generally considered to be highly reactive with epoxy groups. As shown in Table 3, the amine compounds employed in Examples did not exhibit reactivity with epoxy groups despite being highly basic. The present inventors presume this to be due to the compounds employed in Examples having the structure denoted by formula 1.

TABLE 3

| | Reactivity with epoxy groups |
|---|---|
| Example 1, Example 5 Example 7 | None |
| Example 2, Example 8 | None |
| Example 3, Example 9 | None |
| Example 4, Example 10 | None |
| Example 6, Example 11 | None |
| Comp. Example 1 Comp. Example 5 | None |
| Comp. Example 2 Comp. Example 6 | Present |
| Comp. Example 3 Comp. Example 7 | Present |
| Comp. Example 4 Comp. Example 8 | Present |

When the sample solution was prepared using resin (2) instead of resin (1) in the preparation of the carbon black compositions of Comparative Examples 2 to 4 and the liquid stability of the sample solution was evaluated by the method set forth above, the evaluations results were all "OK". Based on these results and the results given in Table 3, reactivity with epoxy groups was considered to decrease the liquid stability of carbon black compositions that contained vinyl chloride resin containing epoxy groups.

An aspect of the present invention can be useful in the field of manufacturing particulate magnetic recording media.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A carbon black composition,
which is a carbon black composition for manufacturing a particulate magnetic recording medium, and comprises:
carbon black,
vinyl chloride resin comprising one or more epoxy groups,
a secondary monoamine which is at least one selected from the group consisting of tetramethylpiperidine, isopropylcyclohexylamine, dicyclohexylamine, and di-sec-butylamine, and
solvent.

2. The carbon black composition according to claim 1, wherein the vinyl chloride resin comprising one or more epoxy groups comprises one or more groups selected from the group consisting of a sulfonic acid group and a salt thereof.

3. The carbon black composition according to claim 1, wherein the molecular weight of the secondary monoamine ranges from 85 to 300.

4. The carbon black composition according to claim 1, wherein the secondary monoamine comprises at least one selected from the group consisting of an alkyl group having a branched methyl group, a piperidine ring, and a cyclohexane ring.

5. The carbon black composition according to claim 1, wherein the boiling point of the secondary monoamine is greater than or equal to 100° C.

6. The carbon black composition according to claim 1, wherein the solvent comprises ketone solvent.

7. The carbon black composition according to claim 1, which comprises 2.0 to 10.0 weight parts of the secondary monoamine per 100.0 weight parts of the carbon black.

8. The carbon black composition according to claim 1, which comprises 20.0 to 50.0 weight parts of the vinyl chloride resin comprising one or more epoxy groups per 100.0 weight parts of the carbon black.

9. The carbon black composition according to claim 1, which is a nonmagnetic layer-forming composition of a particulate magnetic recording medium.

10. A method of manufacturing a particulate magnetic recording medium,
wherein the particulate magnetic recording medium comprises, on a nonmagnetic support, a nonmagnetic layer comprising nonmagnetic powder and binder and a magnetic layer comprising ferromagnetic powder and binder on the nonmagnetic layer,
the method comprises forming the nonmagnetic layer by coating and drying a carbon black composition on a nonmagnetic support,
wherein the carbon black composition comprises:
carbon black,
vinyl chloride resin comprising one or more epoxy groups,
a secondary monoamine which is at least one selected from the group consisting of tetramethylpiperidine, isopropylhexylamine, dicyclohexylamine, and di-sec-butylamine, and solvent.

11. The method of manufacturing a particulate magnetic recording medium according to claim 10,
wherein the vinyl chloride resin comprising one or more epoxy groups comprises one or more groups selected from the group consisting of a sulfonic acid group and a salt thereof.

12. The method of manufacturing a particulate magnetic recording medium according to claim 10,
wherein the molecular weight of the secondary monoamine ranges from 85 to 300.

13. The method of manufacturing a particulate magnetic recording medium according to claim 10,
wherein the secondary monoamine comprises at least one selected from the group consisting of an alkyl group having a branched methyl group, a piperidine ring, and a cyclohexane ring.

14. The method of manufacturing a particulate magnetic recording medium according to claim 10,
wherein the boiling point of the secondary monoamine is greater than or equal to 100° C.

15. The method of manufacturing a particulate magnetic recording medium according to claim 10,
wherein the solvent comprises ketone solvent.

16. The method of manufacturing a particulate magnetic recording medium according to claim 10,
wherein the carbon black composition comprises 2.0 to 10.0 weight parts of the secondary monoamine per 100.0 weight parts of the carbon black.

17. The method of manufacturing a particulate magnetic recording medium according to claim 10,
wherein the carbon black composition comprises 20.0 to 50.0 weight parts of the vinyl chloride resin comprising one or more epoxy groups per 100.0 weight parts of the carbon black.

18. The method of manufacturing a particulate magnetic recording medium according to claim 10,
which comprises forming the magnetic layer by coating and drying a magnetic layer-forming composition comprising ferromagnetic hexagonal ferrite powder and binder on the nonmagnetic layer.

* * * * *